United States Patent
Ayyagari et al.

(10) Patent No.: US 7,512,081 B2
(45) Date of Patent: *Mar. 31, 2009

(54) SYSTEM AND METHOD FOR ACHIEVING ZERO-CONFIGURATION WIRELESS AND WIRED COMPUTING AND COMPUTING DEVICE INCORPORATING SAME

(75) Inventors: Arun Ayyagari, Seattle, WA (US); Sachin C. Sheth, Redmond, WA (US); Krishna Ganugapati, Redmond, WA (US); Timothy M. Moore, Bellevue, WA (US); Pradeep Bahl, Redmond, WA (US); Mihai S. Peicu, Bellevue, WA (US); Florin Teodorescu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 263 days.

This patent is subject to a terminal disclaimer.

(21) Appl. No.: 11/236,777

(22) Filed: Sep. 27, 2005

(65) Prior Publication Data
US 2006/0239209 A1    Oct. 26, 2006

Related U.S. Application Data

(63) Continuation of application No. 09/805,500, filed on Mar. 13, 2001, now Pat. No. 7,120,129.

(51) Int. Cl.
*H04L 12/28*    (2006.01)
*H04Q 7/24*    (2006.01)
(52) U.S. Cl. ........................ 370/255; 370/338
(58) Field of Classification Search ............... 370/245, 370/252, 254, 255, 310, 310.1, 310.2, 338, 370/349; 455/435.2
See application file for complete search history.

(56) References Cited

U.S. PATENT DOCUMENTS 5,850,181 A    12/1998    Heinrich et al.

(Continued)

FOREIGN PATENT DOCUMENTS

JP    2715742    4/1993

(Continued)

OTHER PUBLICATIONS

Brewer, E. A., et al., "A Network Architecture for Heterogeneous Mobile Computing", *IEEE Personal Communications*, IEEE Communications Society, US, vol. 5, No. 5, Oct. 1, 1998, pp. 8-24.

(Continued)

*Primary Examiner*—Hong Cho

(57) ABSTRACT

A system and method for enabling a zero configuration nomadic wireless and wired computing environment presenting a just works experience is presented. The system examines predefined user preference or profile settings to determine to which of a competing number of wireless networks available it should connect, and what type of authentication should be used for such connection. Nomadic wireless computing between infrastructure wireless networks and ad hoc wireless networks may be accomplished without further user intervention required in an auto mode. Also, both infrastructure only and ad hoc only modes are available through the system of the invention. Further, the user may set a preference for infrastructure or ad hoc modes in the auto mode. With an infrastructure mode preference set, the system will automatically detect and transfer connectivity to a newly available infrastructure wireless network if the user was previously operating off-line or in ad hoc mode.

13 Claims, 6 Drawing Sheets

U.S. PATENT DOCUMENTS

| | | | | |
|---|---|---|---|---|
| 6,134,587 | A * | 10/2000 | Okanoue | 709/222 |
| 6,282,577 | B1* | 8/2001 | Okanoue et al. | 709/250 |
| 6,343,220 | B1* | 1/2002 | Van Der Salm | 455/552.1 |
| 6,553,412 | B1* | 4/2003 | Kloba et al. | 709/219 |
| 6,578,085 | B1* | 6/2003 | Khalil et al. | 709/241 |
| 6,711,146 | B2* | 3/2004 | Yegoshin | 370/338 |
| 6,725,278 | B1* | 4/2004 | Gonzalez | 709/248 |
| 6,769,000 | B1* | 7/2004 | Akhtar et al. | 707/103 R |
| 6,779,042 | B1* | 8/2004 | Kloba et al. | 709/248 |
| 6,807,165 | B2 | 10/2004 | Belcea | |
| 6,839,331 | B2* | 1/2005 | Rudnick | 370/312 |
| 2001/0012282 | A1* | 8/2001 | Yegoshin | 370/338 |
| 2001/0023446 | A1* | 9/2001 | Balogh | 709/229 |
| 2001/0024953 | A1* | 9/2001 | Balogh | 455/432 |
| 2001/0047407 | A1* | 11/2001 | Moore et al. | 709/223 |
| 2002/0075844 | A1* | 6/2002 | Hagen | 370/351 |
| 2002/0087674 | A1* | 7/2002 | Guilford et al. | 709/223 |
| 2002/0131371 | A1* | 9/2002 | Rudnick | 370/252 |
| 2003/0203740 | A1 | 10/2003 | Bahl et al. | |
| 2004/0179469 | A1 | 9/2004 | Attar et al. | |
| 2004/0181569 | A1 | 9/2004 | Attar et al. | |

FOREIGN PATENT DOCUMENTS

| | | |
|---|---|---|
| JP | 3497885 | 11/1995 |
| JP | 2963424 | 7/1999 |
| JP | 3007069 | 9/1999 |
| WO | WO0106803 | 1/2001 |

OTHER PUBLICATIONS

Mouly, M., et al., "The GSM System for Mobile Communications Passage", *GSM System for Mobile Communications*, 1992, pp. 446-459.

Perkins, C. E., "Mobile-AP, Ad-Hoc Networking, and Nomadicity", *Proceedings of the 20th Annual International Computer Software and Applications Conference (COMPSAC)*. Seoul, Aug. 21-23, 1996. *Proceedings of the Annual International Computer Software and Applications Conference (COMPSAC)*, Los Alamitos, IEEE Comp., vol. Conf. 20, Aug. 21 1996, pp. 472-476.

Adachi, T., et al., "A Handoff Examination Of A Hybrid System Using Cellular And Ad-Hoc Modes", IEICE *Transactions on Communications*, Institute of Electronics Information and Comm. Eng. Tokyo, Japan, vol. E83-B, No. 11, Nov. 2000, pp. 2494-2500.

Brecher, et al., "Broad-band Wireless Access and Future Communications Networks", *Proceedings of the IEEE*, vol. 89, No. 1, Jan. 2001.

Pahlavan, K., et al., "Handoff in Hybrid Mobile Data Networks", *IEEE Personal Communications*, IEEE Communications Society, US, vol. 7, No. 2, Apr. 2000, pp. 34-47.

Atheros Communications, AR5001X Combo WLAN Solution Brochure, retrieved from www.atheros.com pp. 1-2.

Nobel, Carmel, "For WLAN, It's 802.1 1bm" Eweek retrieved from www.eweek.com/print_article/0.3668.a=18648.00.asp (Nov. 19, 2001) pp. 1-2.

Nandagopal, T., et al., "A Unified Architecture for the Design and Evaluation of Wireless Fair Queuing Algorithms", ACM MobiCom 1999, in proceedings of the *Fifth Annual ACM/IEE International Conference on Mobile Computing and Networking* (Aug. 1999) pp. 132-142.

Keshav, S., "On the Efficient Implementation of Fair Queuing" *Internetworking Research and Experience*, vol. 2, No. 3, 157-173 (1991).

Bharghavan, V., et al., "Fair Queuing in Wireless Networks: Issues and Approaches", *IEEE Personal Communications Magazine*, pp. 44-53 (Feb. 1999).

Parekh, A.K., et al., "A Generalized Processor Sharing Approach to Flow Control in Integrated Services Networks: The Single-Node Case", *IEEE/ACM Transactions on Networking*, vol. 1, No. 3, pp. 344-357 (Jun. 1994).

Parekh, A.K., et al., "A Generalized Processor Sharing Approach to Flow Control in Integrated Services Networks: The Multiple Node Case", *IEEE/ACM Transactions on Networking*, vol. 2, No. 2, pp. 137-150 (Mar. 1994).

Ng, T.S., "Packet Fair Queuing: Algorithms for Wireless Networks with Location-Dependent Errors", *Proceedings of IEEE INFOCOM '98, The Conference on Computer Communications* Vo. 3, *Seventh Annual Joint Conference of the IEEE Computer and Communications Societies*, pp. 1103-1111 (Mar. 1998).

Lettieri, et al., "Advances in Wireless Terminals", *IEEE Personal Communications*, vol. 6, No. 1, (Feb. 1999), pp. 6-19.

Yung-Hsiang Lu, et al., "Requester-Aware Power Reduction", *IEEE*; Sep. 20, 2000 (Sep. 2, 2000), pp. 18-23.

Benini, et al., "System-level Dynamic Power Management", Low Power Design, 1999; Proceedings. IEEE Alessandro Volta Memorial Workshop on Como, Italy Mar. 4-5, 1999, Los Alamitos, CA, USA, *IEEE Comput. Soc*, US, Mar. 4, 1999, pp. 23-31.

Liu, Jun, et al., "Using Loss Pairs to Discover Network Properties", *ACM SIGCOM Internet Measurement Workshop*, 2001, 12 pages.

Zhang, Yin, et al., "On the Constancy of Internet Path Properties", *SIGCOM Internet Measurement Workshop*, 2001, 15 pages.

Lai, Kevin, et al., "Measuring Link Bandwidths Using A Deterministic Model of Packet Delay", in *Proceedings of ACM SIGCOM 2000*, 12 pages.

Balakrishnan, Hari, et al., "Analyzing Stability in Wide-Area Network Performance", In *Proceedings of CAN SIGMETRICS Conference on Measurement & Modeling of Computer Systems*, Seattle, WA, Jun. 1997, 11 pages.

Yavatkar, R., et al., "SBM (Subnet Bandwidth Manager): A Protocol for RSVP-based Admission Control Over IEEE 802-style Networks", *IETF RFC 2814*, retrieved from http://www.faws.org/rfcs/rfc2814.html on May 19, 2002.

Breslau, Lee, et al., "Endpoint Admission Control: Architectural Issues and Performance", In *Proceedings of ACM SIGCOM 2000*, 66. 57-69.

Chaisserini, Carla F., "Combining Paging with Dynamic Power Management", in *IEEE INFOCOM 2001*, pp. 996-1004.

Shih, Eugene, et al., "Wake on Wireless: An Event Driven Energy Saving Strategy for Battery Operated Devices", MOBICOM '02, Sep. 23-26, 2002, pp. 1-12.

Riku Mettala et al., *Bluetooth Protocol Architecture* (White Paper), v1.0, Nokia Mobile Phones, Sep. 29, 1999.

Brent Miller et al., *Mapping Salutation Architecture APIs to Bluetooth Service Discovery Layer* (White Paper), v. 1.0, IBM Corporation, Jul. 1, 1999.

IEEE Standard, 802.11, *Part 11: Wireless LAN Medium Access Control (MAC) and Physical Layer (PHY) Specifications*, 1st Ed. 1999, and Supplements 802. 11a- 1999 and 802. 11b- 1999.

C. Rigney et al., RFC 2865, "Remote Authentication Dial in User Service (Radius)", The Internet Society, Jun. 2000.

B. Aboda and D. Simon, RFC 2716, "PPP EAP TLS Authentication Protocol", The Internet Society, Oct. 1999.

L. Blunk and J. Vollbrecht, RFC 2284, "PPP Extensible Authentication Protocol (EAP)", The Internet Society, Mar. 1998.

IEEE 802.11 *Security White paper*, v0.1, Windows Network Infrastructure team, Microsoft Corporation, Mar. 15, 2000.

T. Muller, *Bluetooth Security Architecture* (White Paper), v.1.0, Jul. 15, 1999.

IEEE 802.1X *Supported Scenarios*, Windows Network Infrastructure team, Microsoft Corporation, v0.1, Apr. 7, 2000.

Guo et al., "Low power distributed MAC for ad hoc sensor radio networks," Proceedings of IEEE Global Telecommunications Conference (Globecom '01), vol. 5, Nov. 25-29, 2001.

Intel., "Sample Installation Scenarios," Intel Wireless Gateway, pp. 1-3, Oct. 9, 2001.

Bob O'Hara and Al Petrick, "802.11 Handbook A Designer's Companion", *Standards Information Network; IEEE Press*.

"Specification of the Bluetooth System", Specification vol. 1, v1.0 B, Dec. 1, 1999.

Benini, Luca, et al., "Monitoring System Activity for OS-Directed Dynamic Power Management", In *Proceedings of 1998 ACM ISLPED*, pp. 185-190.

Benini, Luca, et al., "Dynamic Power Management of Electronic Systems", in *Proceedings of the 1998 IEEE/ACM ICCAD*, Nov. 8-12, 1998, San Jose CA, pp. 696-704.

Hinckley, K., et al., "Sensing Techniques for Mobile Interaction", *ACM UIST 2000 Symposium on User Interface Software & Technology*, CHI Letters 2 (2), pp. 91-100.

*Intel Microsoft Toshiba*, "Advanced Configuration and Power Interface", Revision 1.0, Feb. 2, 1999, 323 pages.

Simunic, Tajana, et al., "Dynamic Power Management for Portable Systems", In *Proceedings of ACM MOBICOM 2000*, Aug. 2000, Boston, MA pp. 11-19.

Simunic, Tajana, et al., "Dynamic Voltage Scaling and Power Management for Portable Systems", In *Proceedings of ACM DAC 2001*, Aug. 2001, pp. 524-529.

Fleishman, Glenn, New Wireless Standards Challenge 802.11b, The O'Reilly Network, at http://www.oreillynet.com/lpt/a//wireless/2001/05/08/standards.html (Jun. 8, 2001), pp. 1-4.

Flickenger, Rob, 802.11B Tips, Tricks and Facts, The O'Reilly Network, retrieved from http://www.oreillynet.com/lpt/a//wireless/2001/03/02/802.11b_facts_.html (Mar. 2, 2001), pp. 1-3.

Press Release, "Atheros Communications, Atheros Ships Combo Rolling Three WLAN Standards into a Single Solution", retrieved from www.atheros.com/news/combo.html (Mar. 11, 2002) pp. 1-3.

Steve Kleynhans, *IBM: Back in the PC Game*, ZDNet, at http://www.zdnet.com/filters/printerfriendly/0,6061,2868907-92,00.html (last visited Sep. 16, 2002).

*Wayport's Successful Trial of Microsoft Windows XP and 802.1x Forecasts a More Secure Environment for Wireless Users*, HITEC Online 2002 Edition, at http://online.hitec.org/news/4009856.2000343.htm (last visited Sep. 16, 2002).

*Wireless LAN Computing with IBM Personal Devices*, IBM White Paper, IBM Personal Systems Group, Dec. 2001, 9 pg.

Barb Bowman, *Unplugged and Unwired*, Microsoft Corp. at http://www.microsoft.com/windowsxp/expertzone/columns/bowman/june11.asp (last visited Sep. 16, 2002).

*Windows XP Segment Analysis for the IBM ThinkPad Notebook Platform*, Strategic Relationship Marketing, Oct. 2001, 1 pg.

*Boingo Launches Nationwide WI-FI Service*, Boingo Wireless Press Releases at http://www.boingo.com/pr/pr3.html (last visited Sep. 20, 2002).

*Boingo Wireless Announces Founding and Funding*, Boingo Wireless Press Releases at http://www.boingo.com/pr/pr1.html (last visited Sep. 20, 2002).

802.11b has reached "escape velocity", Boingo Wireless Market Overview at http://www.boingo.com/marketoverview.html (last visited Sep. 20, 2002).

*Wireless where you want: Wi-Fi is the guerilla revolution of wireless computing*, The Seattle Times: Wireless where you want at http://seattletimes.nwsource.com/html/businesstechnology/134402814_wirelesslan11.html (last visited Sep. 20, 2002).

*Wireless Technology*, Wireless Technology, at http://www.microsoft.com/hwdev/wireless/ (last visited Dec. 8, 2000).

Daniel L. Lough et al., *A Short Tutorial on Wireless LANs and IEEE 802.11*, IEEE 802.11 Short Tutorial at http://www.computer.org/students/looking/summer97/ieee802.htm (last visited Dec. 12, 2000).

Mubashir Alam, *Descriptive Analysis of IEEE 802.11 Standard for Wireless Networks*, at http://triton.cc.gatech.edu/ubicomp.257 (last visited Dec. 12, 2000).

*Zero Configuration Networking* (*zeroconf*), at http://www.zeroconf.org/ (last visited Dec. 12, 2000).

Stuart Cheshire, *Dynamic Configuration of IPv4 link-local addresses*, Apple Computer, at http://www.zeroconf.org/draft-ietf-zeroconf-ipv4-linklocal-00.txt (last visited Dec. 12, 2002).

H. Hattig, editor, *Zeroconf Requirements draft-ietf-zeroconf-reqts-06.txt*, Intel Corp. at http://www.ietf.org/internet-drafts/drafts-ietf-zeroconf-reqts.06.txt (last visited Dec. 12, 2002).

*Enabling IEEE 802.11 Networks With Windows "Whistler"*, at http://www.micorsoft.com/hwdev/wireless/IEEE802Net.htm (last visited Dec. 8, 2000).

* cited by examiner

SYSTEM AND METHOD FOR ACHIEVING ZERO-CONFIGURATION WIRELESS AND WIRED COMPUTING AND COMPUTING DEVICE INCORPORATING SAME

CROSS REFERENCE TO RELATED APPLICATION(S)

This application is a continuation of U.S. patent application Ser. No. 09/805,500, filed Mar. 13, 2001, now U.S. Pat. No. 7,120,129.

TECHNICAL FIELD

This invention relates generally to wireless computing configuration and connectivity, and more specifically to system configuration and connectivity provided for wireless computing for IEEE 802.11 networks.

BACKGROUND OF THE INVENTION

Most businesses have recognized the substantial benefits gained by operating in a networked computing environment. By establishing local area networks (LAN), businesses allow their employees to share network resources, such as printers, file servers, modem banks, e-mail servers, etc., while maintaining the distributed computing power of having a plurality of individual work station computers. Indeed, the benefits of networked computing are now available for home computing environments as more and more households begin having more than one computer. Now, as with at the office, network resources (e.g., a printer) may be shared among the members of the household.

Unfortunately, despite all the benefits that the networks provide, their hardwired architecture presents several problems that tend to limit the users ability to compute in a flexible manner. For example, many networked computer users are now provided the flexibility to take their computers with them wherever they go by utilizing laptop and notebook sized computers. Unfortunately, however, the physical wired architecture often does not accommodate multiple users in a particular location (e.g., in a meeting room) due to the limit of network connection port outlets that are physically installed at that particular location. Therefore, while a user has the theoretical ability to connect to the network from any location wherein a network port outlet is provided, the physical realities of the wiring installation often limit this. Additionally, even if a sufficient number of outlet ports were provided, the requirement for each user to carry around network cabling of lengths sufficient to couple to a network outlet is undesirable from a user standpoint. Likewise, the cost and difficulty of installing network cabling within a household to provide connectivity for each room of the house often limits the actual cable installed to only those fixed locations where computers and network resources are currently located. Therefore, such hardwired systems essentially preclude the mobile computing that has been enabled by the portable computing devices currently on the market.

In recognition of the significant limitations that a wired LAN architecture places on the mobility and flexibility of modern computing, many industry leaders have developed and are now implementing wireless networks. These wireless networks allow for substantially increased flexibility by enabling truly nomadic computing from any location within the business enterprise covered by the wireless LAN. No longer do users need to carry network connection cables and restrict themselves to computing only in physical locations where network connection outlets are provided. This wireless networking technology also has significant advantages for the home computer user who may now have full home network accessibility from any location within the house that is convenient.

Recognizing the tremendous benefits provided by wireless networking, their deployment in airports, hotels, schools, etc., is becoming much more widespread. Further, with the increasing popularity of handheld computing devices, the deployment of such wireless networks in shopping malls, grocery stores, is envisioned. Further, wireless wide area network computing having coverage areas similar to that currently in widespread use for wireless telephone systems enable true nomadic computing regardless of a user's physical location. In this way, nomadic computer users are able to access their network resources and remain productive while waiting on a plane, commuting on a train, etc.

Recognizing that compatibility among the various network service providers who may deploy these wireless networks is of paramount importance to ensure the continued growth and acceptance of such technology, various industry standards have been developed. One such standard developed by the Institute of Electrical and Electronics Engineers (IEEE) is designated by IEEE 802.11. Under this wireless standard, nomadic computer users may form their own network in an ad hoc mode, or may connect to an established network in an infrastructure mode. In the ad hoc mode, there is no structure to the network, and each member is typically able to communicate with every other member. These ad hoc networks may be formed whenever a group of users wish to communicate among themselves to share information such as during a meeting. An example of such an ad hoc formed network under IEEE 802.11 is illustrated in FIG. 2. As may be seen from this simplified Figure, multiple users 200, 202, 204 communicate with one another in their own loosely formed network, all without the requirement of being coupled together by hard wires.

The second type of network structure of IEEE 802.11 is known as an infrastructure network and is illustrated in simplified form in FIG. 3. As may be seen, this architecture utilizes at least one fixed network access point (AP) 206 through which a mobile computer user 208 can communicate with the network members 210, 212, 214 and resources 216, 218, 220. These network access points 206 may be connected to hardwired land lines to broaden the wireless network's capability by bridging these wireless nodes to other wired nodes on the established network 222.

Unfortunately, despite the significant advantages and flexibility that wireless networking brings to the computing environment, once a user has actually become coupled to the wireless network, the current user experience in configuring and connecting to such a wireless network is still quite complex and input intensive. Specifically, once a nomadic computer user enters a wireless network coverage area, the user is required to open a user interface (UI) and select the connection method under 802.11. At work, the nomadic computer user will typically select the infrastructure mode to connect to the corporate LAN. In addition to selecting the type of mode in which to operate, the user must also input the name of the network to which it is to connect. While such an entry is a simple matter when the corporate network name is known, when traveling and in an airport, hotel, etc., the user may not know the network name established therein. Further, it is foreseeable that public places such as airports may well have multiple network service providers available for connection, which further complicates the name selection to allow a user to connect to that particular wireless network. Further, there may be a myriad of other parameters which the user must manually configure to allow full connectivity to the wireless network based upon that user's application and data rate requirements.

Further detracting from the user experience is the requirement of current wireless networks and mobile computing devices that force a user to manually reconfigure the network settings when transferring between networks. For example, a user who accesses a wireless network at work and at home must upon each transition from work to home and back manually reconfigure his wireless network configuration settings before being able to transition from one wireless network to the other. Further, if the user has the wireless network set to infrastructure mode in his home and a problem occurs with one of the machines on the network that includes the functionality of an access point, the user will be forced to manually reconfigure all of the other machines in his house to enable networking in an ad hoc mode. This constant requirement that the user manually reconfigure the wireless network settings and configuration severely limits the promise of true nomadic computing enabled by the underlying wireless network technology.

SUMMARY OF THE INVENTION

The system and method of the present invention involve a zero configuration approach for network connectivity that practically eliminates the need for user interaction. This approach, unlike current systems that require multiple configuration and reconfiguration steps to be undertaken to associate with a network in either the wired or wireless infrastructure or ad hoc modes, provides the user with a "just works" experience. The approach of the present invention performs automatic network connectivity with the "appropriate" network based on various parameters, as may be set by the user and/or programmatically determined by an application. Usage and deduction of location information from the wireless network signals also allows the system of the present invention to properly select output devices based on current location (e.g. will automatically print to a physically proximate printer).

The system operates by periodically scanning across all wireless channels to determine currently available infrastructure networks and machines currently using the ad hoc mode. Based on the scan the system may attempt to associate with a particular infrastructure network based on either an a priori criteria or based on programmatically generated criteria. In the event it does not succeed, the system may attempt to associate with other detected infrastructure networks. Based on the configuration setup, the setup may then choose to join a pre-configured Ad Hoc mode cell if available or create one if one does not exist using a vacant channel if ad hoc networking is to be used. In order to ensure consistent behavior in the Ad Hoc mode when using DSSS, the STA forming an IBSS cell should default to a particular channel. For example, in the ISM 2.4 GHz band, the default may be set to channel 6 (2.437 GHz). Alternatively, the STA forming an IBSS cell may determine the channel that has the least potential for RF interference and default to that particular channel. This preferred channel selection, in one embodiment, is based on appropriate frequency reuse principles and the channels used and received signal strength from beaconing sources.

In one embodiment, Infrastructure mode is preferred over Ad Hoc, although the user may change this. With respect to authentication, the preference for zero configuration IEEE 802.11 usage mode without IEEE 802.1X is a) infrastructure mode, then b) Ad Hoc mode. The preference for zero configuration IEEE 802.11 usage mode using 802.1X authentication is a) Infrastructure mode with login as a valid user with credentials, b) Infrastructure mode with login as an unauthenticated user without credentials, and c) Ad Hoc mode. The service set identifier (SSID) for the Ad Hoc mode may be set to a default value, e.g. MSADHOC, to ensure seamless operation in Ad Hoc mode in the zero configuration approach. In the presence of other ad hoc nodes using a different SSID than the default value, the machine may use the other SSID to communicate with the other ad hoc machine(s).

While currently IEEE 802.11 network interface vendors provide utilities to set configuration parameters, one embodiment of the present invention is to cache key preferred IEEE 802.11 configuration parameters such as SSID for Infrastructure and Ad Hoc modes. The ability to set such generic configuration information enhances user experience by enabling a common approach to the instantiation of IEEE 802.11 configuration parameters across network interface vendors.

In addition to the wireless computing environments just discussed, application of the teachings of the invention in a wired computing environment is also contemplated. The notion of zero configuration may also be extended to higher networking layers. For example, in cases where multiple network interfaces are active within a device, the application of the zero configuration of the present invention to this layer involves the selection of an appropriate network interface based on selection criteria, such as interface speed, interface type, and other cost metrics. This selection process takes place at a generic layer of the zero configuration approach. However, within each interface type an interface specific zero configuration layer may be used to select a preferred interface, if more than one physical interface is available for that particular network connectivity topology.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
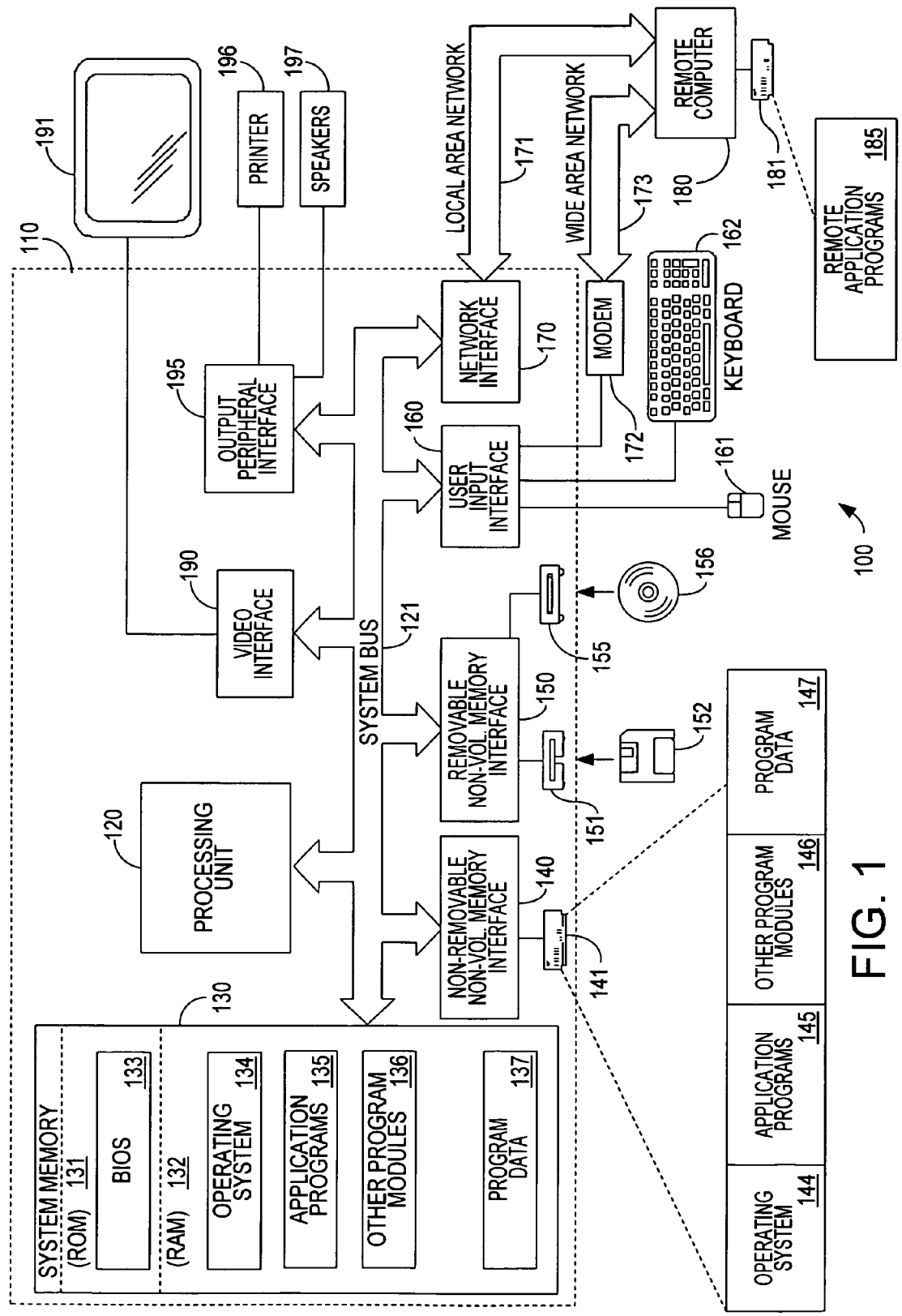
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, optical and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks, e.g. the wireless personal area network (PAN). Such networking environments are commonplace in offices, enterprise-wide computer networks, intranets and the Internet.

When used in a LAN networking environment, the personal computer 110 is connected to the LAN 171 through a network interface or adapter 170. This network interface or adapter 170 may be connected by hard wire, or may be in wireless communication with a wireless LAN 171 by radio frequency, infrared, etc. communications. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

The system and method of the present invention allows the computer system just discussed to operate in a wireless network, without requiring that the user to reconfigure the wireless network settings each time a connection to a different wireless network is desired, or when multiple networks are available. This provides a "just works" user experience, which greatly enhances the ability to realize the benefits of true nomadic computing. In this way, a wireless computer user may work on an established network at home, at work, in transit, at the airport, in a hotel, etc., and may form ad hoc wireless networks with other wireless users all without having to manually reconfigure or adjust network variable settings to enable association with the different network types.

As discussed briefly above, various wireless networking standards have been and are being proposed. While the system and method of the invention will be described in conjunction with the IEEE 802.11 wireless networking specification, one skilled in the art will realize from the following description that the inventive concepts disclosed herein are not limited only to this one standard. Indeed, the zero configuration methodology of the present invention providing a "just works" experience to wireless computer users is applicable to all wireless and wired computing environments.

Figure 2:
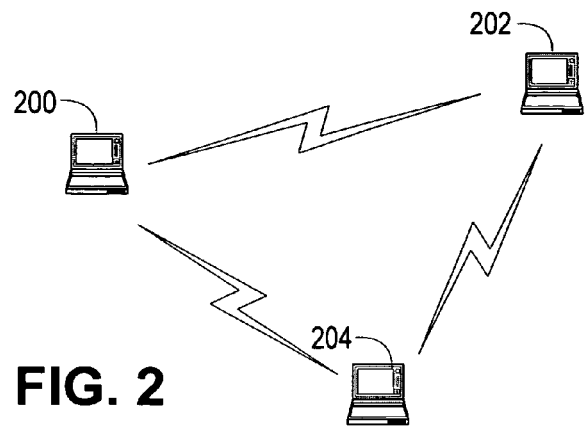
FIG. 2 illustrates an IEEE 802.11 Ad Hoc wireless network.

In the IEEE 802.11 networking environment, there are two modes of operation available as introduced above, the Ad Hoc mode and the Infrastructure mode. As previously discussed, FIG. 2 illustrates a simplified illustration of three IEEE 802.11 compliant computers, known as stations (STAs) 200, 202, 204, operating in an Ad Hoc wireless infrastructure mode. In this mode, the stations 200, 202, 204 form their own network, separate and apart from any network service provider or hardwired corporate LAN (with appropriate wireless access point (AP)). Such an ad hoc network allows a group of wireless computer users to associate as desired to collaborate, etc. in a meeting, at home, when no infrastructure network is available, etc.

Figure 3:
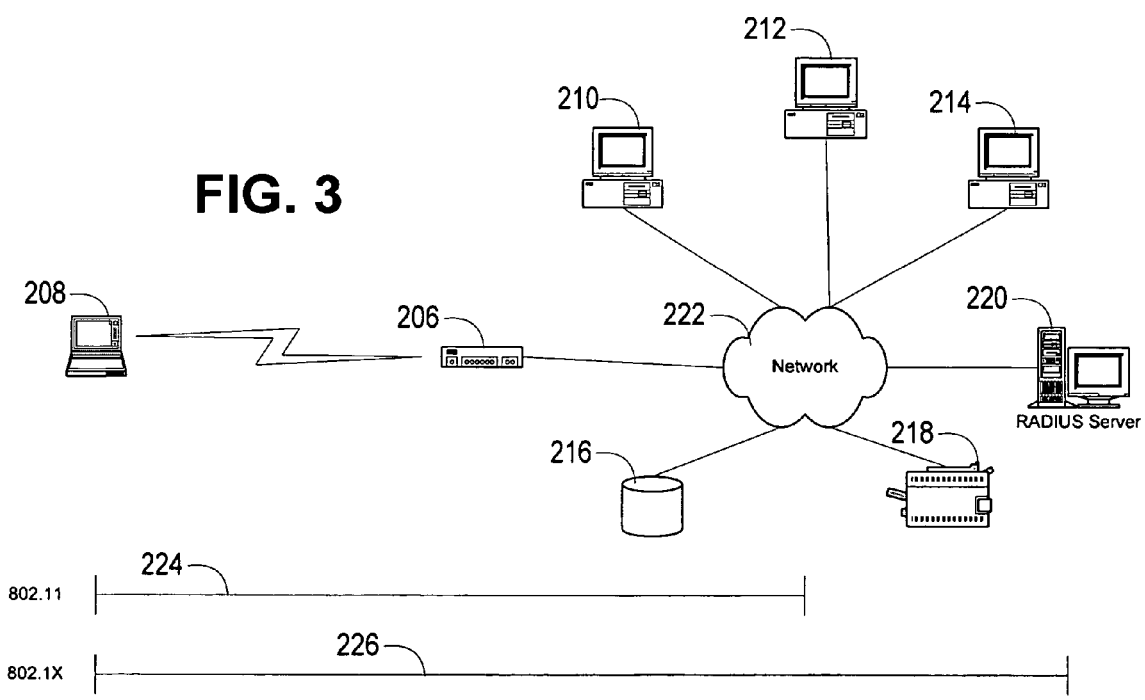
FIG. 3 illustrates an IEEE 802.11 Infrastructure wireless network.

IEEE 802.11 also provides for an Infrastructure networking mode as illustrated in simplified form in FIG. 3. In this mode, a wireless station (STA) 208 couples to the network 222 via a wireless access point (AP) 206. Once connected, the STA 208 has full networking ability to collaborate with other users 210, 212, 214 on the network 222, to use system resources (such as printer 218), to access network file servers 216, etc. as if the STA 208 were hardwired to the network 222. Authentication of the STA 208 is provided in IEEE 802.11 as a link layer authentication, illustrated as line 224 between the STA 208 and the network 222. Enhanced user authentication to the Remote Authentication Dial In User Service (RADIUS) server 220 is also provided by the system of the present invention as illustrated by line 226 from the STA 208 all the way to the RADIUS server 220. Indeed, the system and method of the present invention also allows for additional or different authentication protocols and authentication servers to be used as desired.

Figure 4:
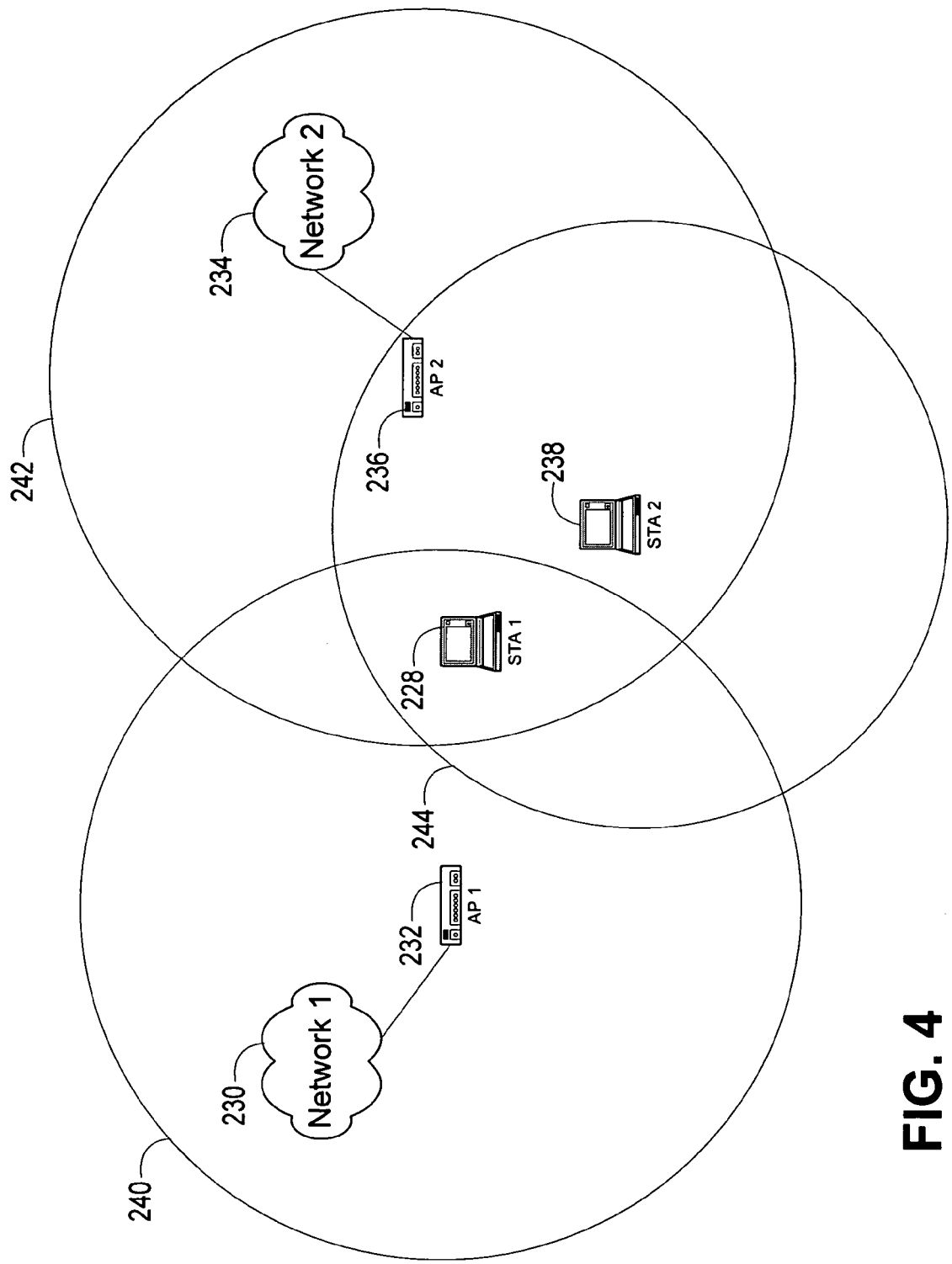
FIG. 4 is a simplified wireless network coverage zone diagram illustrating overlapping areas of coverage by different wireless network service providers and stations.

While it may be argued that operating in either of the modes illustrated in FIGS. 2 and 3 presents no undue burden for the wireless computer network user, the transition from one type to the other does present the manual reconfiguration and connection problems discussed above. Further, the selection of the appropriate or preferred network among several available also presents a challenge to the wireless network user. Such a situation is illustrated in FIG. 4. As may be seen, it is possible, and indeed it may turn out to be the norm, that a station 228 (STA 1) may be able to network with network 1 230 via AP1 232, with network 2 234 via AP 2 236, and with another wireless user (STA 2) 238 in an Ad Hoc mode. The circles 240, 242, and 244 represent the signal coverage area of network APs 232, 236, and STA 2 238, respectively. Such a situation may be common in public access areas, such as, e.g., airports, where multiple network service providers may have contracted to provide service and where multiple individual wireless computer users may be working ad hoc.

Figure 5:
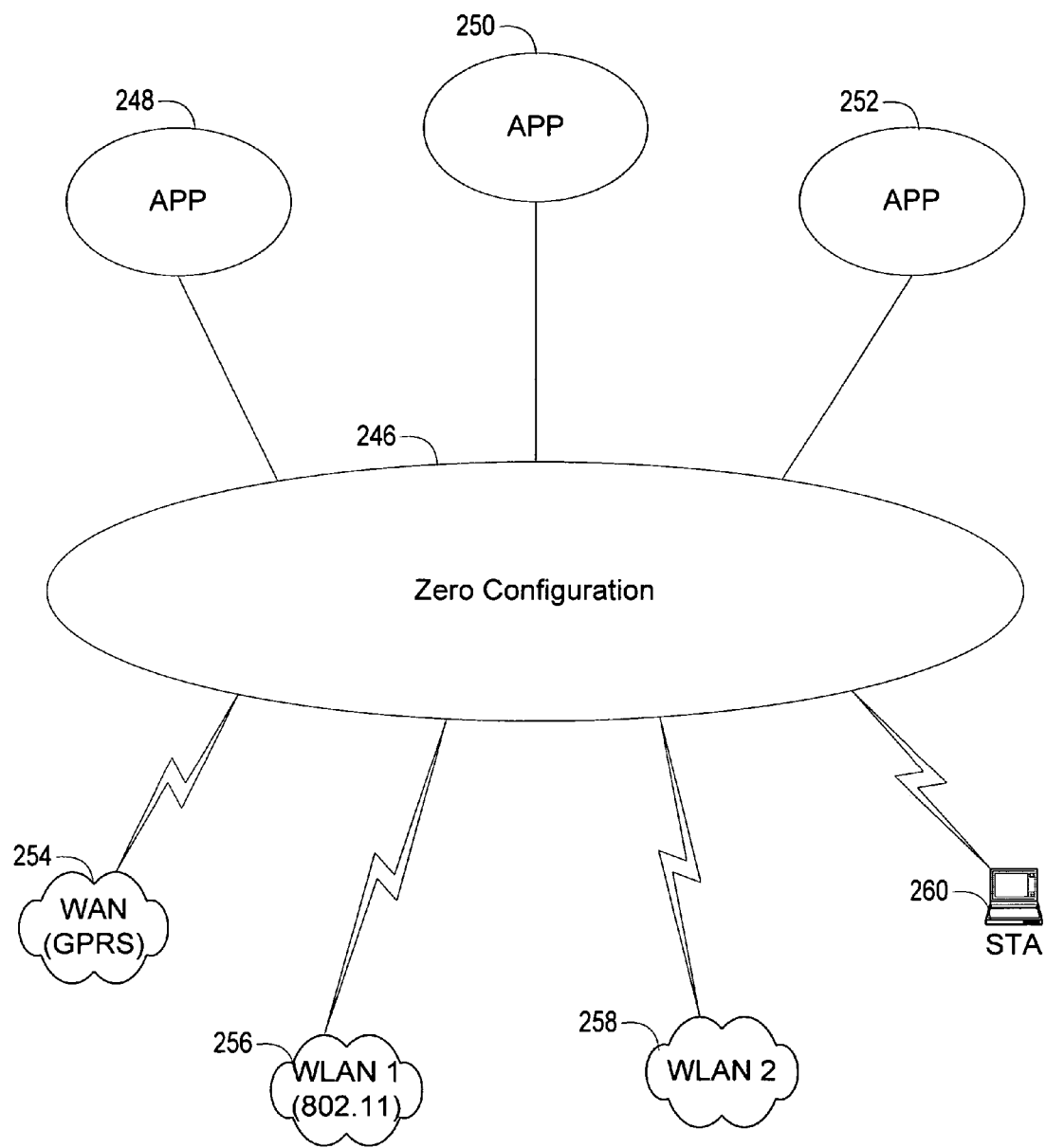
FIG. 5 is a simplified functional diagram illustrating the logical interface provided by the zero configuration system and method of the invention between various applications and the multiple wireless networks that are available.

The zero configuration system and method of the invention, therefore, provide the controlling logic to determine when, how, and to whom a wireless user connects from the competing wireless networks available at any given time and place, all without requiring user intervention or reconfiguration. As illustrated in FIG. 5, the zero configuration system 246 operates as an interface between the various applications 248, 250, 252 and the various wireless networks (e.g., WAN 254, WLAN1 256, WLAN2 258, STA 260) to which they may be connected. The system 246 of the invention may utilize a much richer set of underlying criteria to make the connection decisions based on the information available to it. These criteria may include a multitude of factors including, e.g., service/network provider, signal strength from the various APs, data rates available from the various networks and required by the particular application, authentication systems used, cost per connection time, and other operating profiles (policies) that may be set by the user or may be downloaded from the employer. These policies may cover many more situations than could ever be remembered by an individual user, such as the preferred network connection configuration in all the major cities in the US. This is especially true if the company has branch offices in those cities or preferred agreements with different wireless network providers in different markets.

To set individual preferences, the wireless user may choose various settings for a particular interface through a user interface (UI). While this UI may take many forms, a preferred embodiment utilizes a configuration window. If multiple tabs are provided in the UI, the configuration parameters for the system of the present invention may be placed under the tab reference entitled, e.g., "Advanced". Under this "Advanced" tab the user is provided with various setting options that allow the user to tailor the operation of the system of the invention to his or her personal preferences. One option that is provided in one embodiment is an "Authentication" option setting that one can set (e.g., through a check-box) to enable IEEE 802.1X authentication. If this option is selected, the user thereafter may select the authentication method, e.g., EAP-TLS, EAP-MD5, or EAP-MSCHAP (via, e.g., a pull-down menu) to be used. When this authentication option setting is set, the STA will preferably use the IEEE 802.11 open authentication mode.

The UI of the present invention also preferably provides a zero configuration option setting that one shall set (e.g., a check-box) to enable zero configuration for the particular wireless IEEE 802.11 network interface. The zero configuration option setting is preferably selected by default, i.e., zero configuration check-box should be checked. Note that it is possible for a user to enable zero configuration while not enabling IEEE 802.1X authentication on the STA. If the zero configuration option is selected, the STA will preferably use IEEE 802.11 open authentication mode. For non-IEEE 802.11 network interfaces, the zero configuration option setting may be ghosted out.

The UI of the present invention also provides the ability to select the Ad Hoc mode of operation. The Ad Hoc mode setting for the service set identifier (SSID) preferably includes a hard-coded default option in the Windows platform to "MSADHOC". Default settings for other operating platforms may also, of course, be provided. In this way, when the code queries for the existence of a particular registry variable that contains the SSID value for the Ad Hoc mode, if the variable does not exist in the registry, the code may use the default value of "MSADHOC". If there is a variable in the registry, the system may use the value in the particular registry variable. The user intending to change the default SSID for Ad Hoc mode may create a registry variable and instantiate it to the desired Ad Hoc mode SSID value. This ensures seamless operation for the normal Windows platform user under the zero configuration approach, while more advanced user are able to modify Ad Hoc mode SSID setting to the desired value via a registry setting update. Again, if the STA sees an ad hoc SSID existing in the network, it could use that to communicate with the STAs in that ad hoc network. Whether it goes with the registry value or MSADHOC or a visible ad hoc SSID as the SSID can be determined by policy (downloaded policy or specified through a UI setting).

In a preferred embodiment, right clicking the network-interface icon for IEEE 802.11 network interfaces on the "sys tray" in the Windows environment will provide the user with network configuration details and also enable the user to make a selection. The Infrastructure mode category title will display a list of compatible (FH or DS) SSIDs visible in infrastructure mode. The user may then select a particular SSID from the displayed list. This is an extension to the Auto mode (discussed below) where the user specifies an SSID preference in the Infrastructure or Auto modes (in a preferred embodiment of the present invention the SSID list includes both infrastructure SSIDs and ad hoc SSIDs).

If the user had earlier selected the Ad Hoc mode category, selecting a particular SSID from the displayed list would enable the STA to force a transition out of Ad Hoc mode and restart the association mechanism per IEEE 802.11 usage mode specified by the authentication option discussed above. Likewise if the user had selected the Infrastructure mode, selecting a particular SSID would enable the STA to disassociate from the current SSID and restart the association mechanism per IEEE 802.11 usage mode specified by the authentication option discussed above. In a preferred embodiment, such a transition from Ad Hoc to Infrastructure mode or between SSIDs in the same mode preferably forces the STA to perform a scan by setting the SSID to a null value to update the SSID list before setting the SSID to the selected value. The STA may also force a scan followed by retrieval of the SSID list (NDIS OID_802_11_BSSID_LIST_SCAN and NDIS OID_802_11_BSSID_LIST in Windows platform embodiment), following which, the STA may set the selected SSID value. If the user selects a particular SSID displayed, the IEEE 802.11 network interface will be set to the mode pertinent for the SSID, i.e. infrastructure or ad hoc, open authentication mode, and then set the SSID to the user selection The system of the present invention will cache the value of the particular SSID selected for present and future use in the Auto mode (discussed below). Further, an alternate embodiment of the system of the present invention also caches multiple SSIDs selected, e.g. caching the last 4 distinct SSIDs selected by the user. This is particularly useful in the Auto and Infrastructure modes where the user would like the STA to initially attempt to associate with the preferred SSID(s) (selected or in the cache) among the retrieved SSID list (NDIS OID_802_11_BSSID_LIST in the Windows platform embodiment) if one is visible before attempting to associate with other visible SSIDs in the retrieved list.

In the UI of one embodiment, the Ad Hoc mode category title is displayed below the Infrastructure mode category title and the list of visible SSIDs. Once the user selects the Ad Hoc mode, the STA will remain in the Ad Hoc mode until the user selects an SSID in the list under Infrastructure mode or the Auto mode. If the user selects the Ad Hoc mode, the IEEE 802.11 network interface will be set to Ad Hoc mode. The Ad Hoc mode SSID value will also be set to a pre-configured SSID value in a particular registry variable if present (as discussed above) and if the registry variable is not present it should be set to "MSADHOC". Again, if there are visible ad hoc SSIDs and none of them is the preferred MSADHOC, the STA may associate with the first one.

In a further embodiment, the STA also presents a list of visible SSIDs in the Ad Hoc mode under this title. This list is generated by the initial scan process (NDIS OID_802_11_BSSID_LIST_SCAN in the Windows platform) followed by the retrieval of the SSID list (NDIS OID_802_11_BSSID_LIST in the Windows platform). This retrieved list includes information regarding the STAs beaconing in Ad Hoc mode. The user may select an Ad Hoc SSID from the list so that the STA associates with the particular IBSS cell. By default in a preferred embodiment, the list should include the SSID "MSADHOC" even if the particular IBSS cell is not visible. This enables the user to reset the Ad Hoc mode SSID value to the preferred Windows platform default setting of "MSADHOC" when desired. The system may also cache (instantiate/update the registry variable) the last selected Ad Hoc mode SSID value for future associations.

The Auto mode category title introduced above is displayed below the Ad Hoc Mode category title in the UI of one embodiment of the present invention. The Auto mode is preferably the default setting when the zero configuration option is set in the UI under the Advanced tab for a particular network interface, as discussed above. Also, the user is allowed to select the Auto mode if currently operating in any other mode. If the user had earlier selected the Ad Hoc mode category, selecting the Auto mode enables the STA to force a transition out of Ad Hoc mode and restart the association mechanism to an Infrastructure mode wireless network if one is available. This association mechanism will be accomplished per the IEEE 802.11 usage mode specified as discussed above depending on whether the authentication option was selected or not. In a preferred embodiment, following a transition from Ad Hoc to Auto mode the STA will first perform a scan (by setting the SSID to null value or a call to the NDIS OID_802_11_BSSID_LIST_SCAN in the Windows platform) to update the SSID list. Following this the STA will initially attempt to associate with the preferred SSID(s) if one is visible (in the cache discussed above) from among the retrieved SSID list before attempting to associate with other visible SSID in the retrieved list. When the user selects the Auto mode, the IEEE 802.11 network interface will be set to the zero configuration approach utilizing the IEEE 802.11 usage mode specified.

If the zero configuration option is selected and the IEEE 802.11 network interface is in the Ad Hoc mode (for a reason other than user selection of the Ad Hoc mode, e.g., the system is in the Auto mode and no Infrastructure wireless network was originally available), when the IEEE 802.11 network interface detects the availability of an infrastructure SSID that it has not failed an IEEE 802.11 association or IEEE 802.1X authentication attempt, the system of the present invention will revert from the Ad Hoc to Infrastructure mode. Once in the Infrastructure mode, the system will attempt to associate and authenticate with the particular SSID that has just become available. This may be accomplished, for example, through a polling mechanism by which the basic service set identification (BSSID) List is retrieved periodically by the system to determine whether to revert to Infrastructure mode.

In one embodiment of the present invention operating in the Windows environment, the zero configuration system utilizes various new object identifiers (OIDs) through the network driver interface specification (NDIS) miniport driver to enable the new functionality of the present invention. These OIDs include the following:

| OID (Hex) | OID Name | Indication | Query | Set | Mandatory |
|---|---|---|---|---|---|
| 0D010101 | OID_802_11_BSSID | | X | X | X |
| 0D010102 | OID_802_11_SSID | | X | X | X |
| 0D010203 | OID_802_11_NETWORK_TYPES_SUPPORTED | | X | | |
| 0D010204 | OID_802_11_NETWORK_TYPE_IN_USE | | X | X | X |
| 0D010205 | OID_802_11_TX_POWER_LEVEL | | X | X | |
| 0D010206 | OID_802_11_RSSI | X | X | | X |
| 0D010207 | OID_802_11_RSSI_TRIGGER | | X | X | |
| 0D010108 | OID_802_11_INFRASTRUCTURE_MODE | | X | X | X |
| 0D010209 | OID_802_11_FRAGMENTATION_THRESHOLD | | X | X | |
| 0D01020A | OID_802_11_RTS_THRESHOLD | | X | X | |
| 0D01020B | OID_802_11_NUMBER_OF_ANTENNAS | | X | | |
| 0D01020C | OID_802_11_RX_ANTENNA_SELECTED | | X | X | |
| 0D01020D | OID_802_11_TX_ANTENNA_SELECTED | | X | X | |
| 0D01020E | OID_802_11_SUPPORTED_RATES | | X | | X |
| 0D010210 | OID_802_11_DESIRED_RATES | | X | X | |
| 0D010211 | OID_802_11_CONFIGURATION | | X | X | X |
| 0D020212 | OID_802_11_STATISTICS | | X | | |
| 0D010113 | OID_802_11_ADD_WEP | | | X | X |
| 0D010114 | OID_802_11_REMOVE_WEP | | X | X | X |
| 0D01011B | OID_802_11_WEP_STATUS | | | X | X |
| 0D010115 | OID_802_11_DISASSOCIATE | | | X | X |
| 0D010216 | OID_802_11_POWER_MODE | | X | X | |
| 0D010217 | OID_802_11_BSSID_LIST | | X | | X |
| 0D01011A | OID_802_11_BSSID_LIST_SCAN | | | X | X |

-continued

| OID (Hex) | OID Name | Indication | Query | Set | Mandatory |
|---|---|---|---|---|---|
| 0D010118 | OID_802_11_AUTHENTICATION_MODE | | X | X | X |
| 0D010119 | OID_802_11_PRIVACY_FILTER | | X | X | |

In operating systems other than Windows, e.g., Linux, Unix, etc., the media sense is from the network card, and may be passed up to the zero configuration application.

Figure 6:
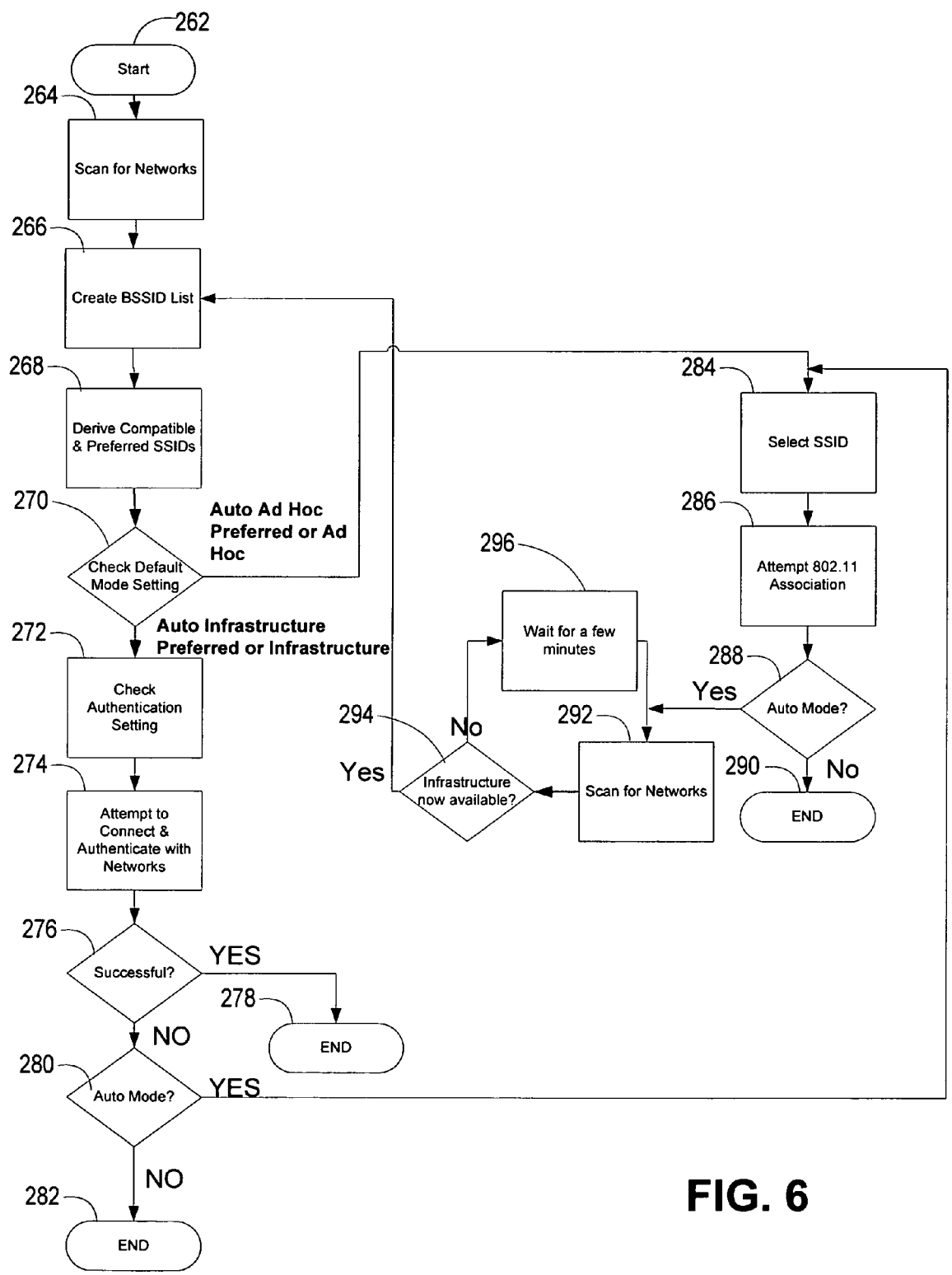
FIG. 6 is a simplified flow diagram illustrating the automated detection, selection, and association process of the present invention.

Operation of the zero configuration system of the present invention may be better understood with reference to the simplified flow diagram of FIG. 6. Once the wireless network card is discovered and found enabled, the system of the invention performs a scan 264 to determine the available wireless networks to which it may associate. From this scan, the system builds a BSSID list 266 of the networks detected. From this list, the system derives the compatible and preferred providers (SSIDs) 268 from the user preference settings or policies file.

Once the wireless networks are detected and the user preferences checked, the system checks the default mode setting 270 for the wireless network card to determine if the user has enabled the Auto Infrastructure Preferred or Infrastructure modes, or the Auto Ad Hoc Preferred or Ad Hoc mode. If it is the Infrastructure or Auto Infrastructure preferred mode the system determines the authentication setting selected by the user 272. Based on this setting, the system of the invention begins to attempt to connect and authenticate with the available networks 274. If the IEEE 802.1X option is selected, the system will first to perform an IEEE 802.11 association with one of the networks (as determined by step 268). If the system cannot perform the IEEE 802.11 association with the selected network, the system moves to the next preferred network. Once the IEEE 802.11 association has succeeded with one of the networks, the system then attempts to perform IEEE 802.1X authentication as a valid user with credentials. If this authentication is successful 276, the system stays with that network 278. If, in step 274, no networks succeed the IEEE 802.1X authentication as a valid user with credentials, the system attempts to perform IEEE 802.1X authentication as an unauthenticated user without credentials. As with the above, this process progresses sequentially through the list of networks, from the preferred to the remainder, until one is found that succeeds (step 276).

If the authentication setting determined by step 272 does not require that the system utilize IEEE 802.1X authentication, the system attempts to perform an IEEE 802.11 association with one of the networks (as determined by step 270). If the system cannot perform the IEEE 802.11 association with the selected network, the system moves to the next preferred network, and if all of the preferred networks fail, to the remainder of the BSSID list. Once the IEEE 802.11 association has succeeded with one of the networks 276, the system stays with that network 278.

If, however, no successful association can be made and the system has been set to the Infrastructure mode 280, the system ends the association attempts 282 and remains off-line (i.e., not connected to a wireless network). If, on the other hand, the user had set the system to the Auto mode 280, the system transitions to the Ad Hoc mode. Once in the Ad Hoc mode (either through the Auto mechanism 280 or through the setting of Ad Hoc mode determined at block 270), the system selects 284 an SSID with which to associate. As discussed above, this SSID may be a value in a particular registry variable, if present, or may be the default value of MSAD-HOC if the registry variable is not present or may be one of the ad hoc SSIDs visible on the wireless network. In the current IEEE 802.11 b wireless space in the US there are 11 RF channels. In one embodiment, the system of the invention, if using the registry specified value or the MSADHOC value, parks in a default channel (e.g., channel 6) to form an Ad Hoc network association. In another embodiment, the system scans the channels and determines which channels are free (not in use) at this location before deciding in which channel to establish the wireless Ad Hoc network in order to minimize RF interference. If associating with a visible MSADHOC or some other ad hoc SSID, it parks itself in the channel on which this SSID is active.

Once this selection and the selection of the SSID has taken place, the system of the present invention attempts to perform an IEEE 802.11 association with the selected SSID 286. If the system of the invention determines that the other STA to which it will associate is physically proximate (as determined by the signal strength), the system may buck the transmit power. If the association is successful, the user is now operating in an Ad Hoc mode. If not, the user continues to operate off-line.

If the system is in the Ad Hoc mode 288, the association process ends at this point 290, until additional STAs become visible (through the channel scan, beaconing of the STAs, user selection of a network discover, user addition of another preferred SSID, etc.). If, however, the system of the invention is in Auto mode 288 with the default "Infrastructure mode preferred" set (the user may set a preference for Ad Hoc mode if so desired), the system continues to look for the appearance of Infrastructure networks 292. If a new Infrastructure wireless network becomes available 294, the system will once again cycle through the functional blocks 266 et seq. in an attempt to associate with the Infrastructure wireless network. If no new Infrastructure wireless network becomes available 294, the system waits for a few minutes 296 before again looking for the appearance of Infrastructure networks 292.

In at least embodiments operating in the Windows environment, the system of the present invention is able to triangulate the position of the STA by knowing the position of the APs and the relative signal strengths of each through the network location API in Windows. This allows the zero configuration system to properly select network resources based on physical proximity. For example, by knowing the location of the wireless STA, a file selected to print may be sent to the closest printer, as opposed to the typical default printer at the users typical workstation. This information may also be used to pull up relevant information for that particular location, such as floor plans and location of network resources, etc.

Figure 7:
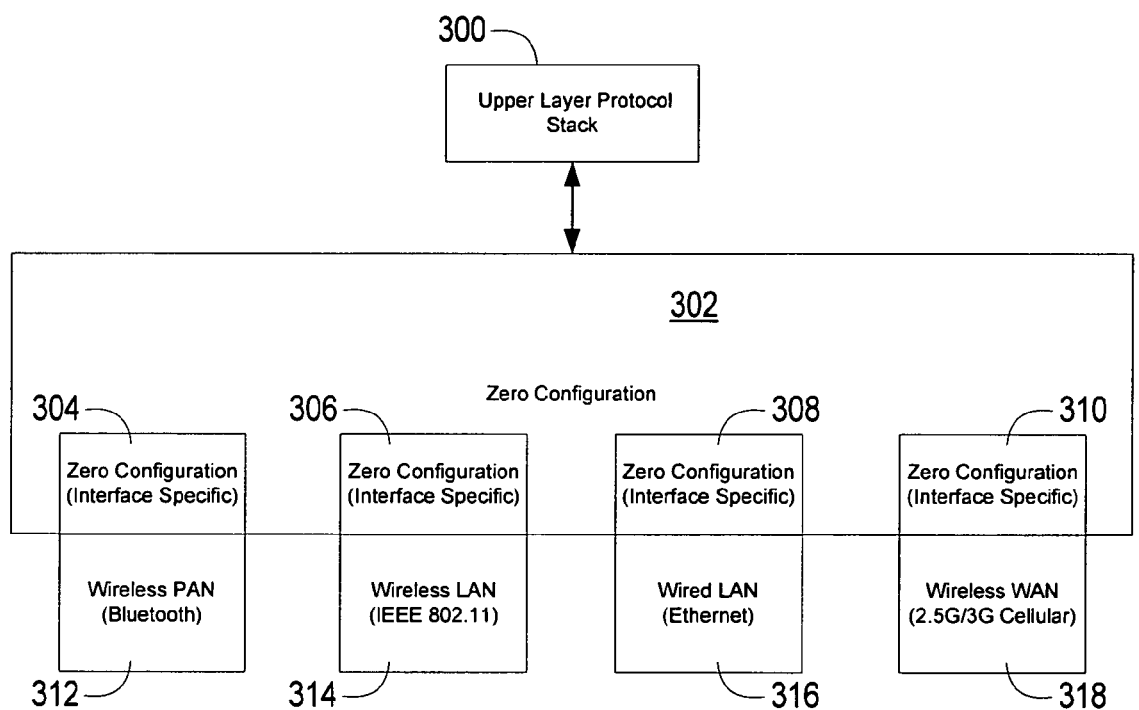
FIG. 7 is a simplified functional diagram illustrating the logical interface provided by the zero configuration system and method of the invention from the upper layer protocol stack and the multiple networks that are available, both wireless and wired.

While the above discussion has focused mainly on the operation of the zero configuration system and method of the present invention in the context of wireless computing environments, FIG. 7 illustrates that the present invention is not so limited. Indeed, a computing device may have a number of active interfaces that interconnect with available and potentially available networks. The upper layer protocol stack 300 including applications requires peer level network connectivity with other computing devices. Network access to enable peer-to-peer connectivity at the upper layer protocol stack 300 may be accomplished via a combination of lower layers of the protocol stack consisting of the network, link, and physical layers. From the upper layer protocol stack 300 perspective, it merely seeks network connectivity with the required parameters such as bandwidth, latency, and other cost metrics as well as policy. As such, FIG. 7 illustrates the zero configuration architecture consisting of a generic layer 302 interfacing with the upper layer protocol stack 300 above and interacting with interface-specific zero configuration layers 304, 306, 308, 310 below. The functionality of the generic portion of the zero configuration layer 302 operates to determine the appropriate interface (e.g., Wireless PAN 312, Wireless LAN 314, Wired LAN 316, and Wireless WAN 318) among the available active interface-specific zero configuration layers 304, 306, 308, 310. As described above, this selection may be based on criteria such as network parameter requirements.

Each interface-specific portion 304, 306, 308, 310 of the zero configuration layer 302 is applicable to a specific interface, such as the Wireless PAN 312, Wireless LAN 314, Wired LAN 316, and Wireless WAN 318, respectively. Additionally, the algorithms used for the enumeration and selection of the active interface-specific zero configuration layer 304, 306, 308, 310 are equally applicable within each of the interface-specific portions 304, 306, 308, 310 of the zero configuration layer 302. That is, within each of the interface-specific interfaces 312, 314, 316, 318 there may exist a number of instances of the actual physical interfaces. For example, a computing device may have more than one wired Ethernet interface connected to the same or different networks. Therefore, part of the interface-specific zero configuration functionality in layer 308 may also include simultaneous use of multiple physical interfaces for higher bandwidth and load balancing across multiple active physical interfaces. Similarly, the generic portion of the zero configuration layer 302 may also engage in load balancing across multiple active interface-specific zero configuration layers 304, 306, 308, 310. As discussed above, the IEEE 802.11 zero configuration layer 306 enables a computing device to first determine the available IEEE 802.11 networks 314 in its vicinity and establish connectivity with the preferred IEEE 802.11 network from the list of visible IEEE 802.11 networks. Similarly, the wired Ethernet zero configuration layer 308 with multiple active physical interfaces 316 may determine which interface should be used to connect to the network.

An example of a user scenario enabled by the generic zero configuration layer 302 is given below. In this example, the computing device includes a General Packet Radio Service (GPRS) network interface 318 (a 2.5 G cellular wireless WAN solution), an IEEE 802.11 network interface 314 (a wireless LAN solution), and an Ethernet card 316 (a wired LAN solution). Initially, the user is outside the IEEE 802.11 wireless LAN coverage but is within the GPRS wireless WAN coverage. In this situation, the zero configuration layer 302 establishes network connectivity via the GPRS wireless WAN interface 318, and the user has access to the required computing resources.

As the user enters a building that has IEEE 802.11 wireless LAN coverage, the generic portion of the zero configuration layer 302 determines that it can now avail itself of both the GPRS wireless WAN and IEEE 802.11 wireless LAN. The available bandwidth of a IEEE 802.11 wireless LAN is typically much greater than the GPRS wireless WAN and the user may incur additional costs to use the GPRS wireless WAN. Therefore, the zero configuration layer 302 may establish the network connectivity via the IEEE 802.11 wireless LAN and re-direct all ongoing and future network connections via this interface 314. Once this has been accomplished, the GRPS wireless WAN connectivity may be disabled.

The IEEE 802.11 connectivity is maintained as the user moves throughout the building. As the user enters his/her office, the user may connect the portable computing device to an Ethernet connection by, e.g., plugging in a cable or placing the computing device in a docking station that has a hard-wired LAN connection. At this point, the zero configuration layer 302 again operates based on user preferences and system parameters to establish network connectivity via the wired LAN interface 316. If the computing device were a laptop computer having both a PCMCIA (Personal Computer Memory Card International Association) network card and docking station connectivity to the wired LAN, the interface specific zero configuration layer 308 would choose the appropriate of the two interfaces 316 through which to establish the network wired connection.

By this mechanism the generic zero configuration layer 302 determines the available active interface specific zero configuration layers (306, 308, and 310 in this example) and preferentially selects the appropriate interface 318, 314, 316 at any given instant. It should be noted that while it is normally feasible to re-direct ongoing data connections without impacting user experience, it may not be possible to do the same for ongoing real-time applications such as voice communication. In such cases the zero configuration layer 302 may selectively re-direct only the acceptable ongoing connections. The re-direction of connections based on the availability of a more suitable interface specific zero configuration layer (304, 306, 308, 310) is accomplished without user intervention. From an upper layer protocol stack 300 and applications perspectives the zero generic configuration layer 302 constantly works towards providing the most appropriate network connectivity from the list of available active interface specific zero configuration layers 304, 306, 308, 310. Similarly, each of the interface specific zero configuration layers 304, 306, 308, 310 constantly works towards providing the most appropriate physical network connectivity from the available list of active physical network interfaces 312, 314, 316, 318.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for connecting a computing device of a computer user to at least one network of a type selected from a group comprising a wireless telephone network, a wired infrastructure computer network, a wireless infrastructure computer network, and a wireless ad hoc computer network, the method comprising:

checking user preferences for network connectivity, wherein checking user preferences comprises the step of checking for an authentication mode setting and a default mode setting, the default mode setting including an infrastructure mode allowing connectivity only with wireless infrastructure computer networks, an ad hoc mode allowing connectivity only with wireless ad hoc computer networks, an auto infrastructure preferred mode allowing connectivity with wireless infrastructure computer networks and wireless ad hoc computer networks with a preference for the wireless infrastructure computer networks, and an auto ad hoc preferred mode allowing connectivity with wireless infrastructure computer networks and wireless ad hoc computer networks with a preference for wireless ad hoc computer networks;

scanning for network presence of the at least one network;

connecting the computing device to the at least one network based on the user preferences, wherein connecting to the at least one network comprises the steps of associating with a wireless infrastructure computer network, and connecting as a valid user with credentials;

if connecting the computing device to the at least one network fails, selecting an ad hoc mode of operation when the default mode setting is set to auto mode; and operating the computing device in an off-line mode when network connectivity is not available.

2. The method of claim 1, wherein the step of checking user preferences further comprises the steps of checking for a default mode setting, and checking for a preferred list of network providers.

3. The method of claim 2, further comprising the steps of constructing a all networks discovered, and deriving preferred and compatible network names from the list, wherein the step of connecting to a network comprises connecting the computing device to the preferred and compatible networks.

4. The method of claim 3, wherein the step of connecting the computing device to the preferred and compatible networks comprises the steps of selecting one of the preferred and compatible networks, attempting to associate with the selected one of the preferred and compatible networks based on the authentication mode setting, and when unable to associate with the selected one of the preferred and compatible networks selecting another of the preferred and compatible networks to which to attempt association until an association is formed.

5. The method of claim 1, wherein the step of connecting to the at least one network comprises the steps of performing IEEE 802.11 association with a wireless infrastructure computer network.

6. The method of claim 1, wherein the step of connecting to the at least one network further comprises the step of connecting as an unauthorized user without credentials when the step of connecting as a valid user with credentials fails.

7. The method of claim 1, wherein the step of connecting to the at least one network comprises the step of performing IEEE 802.11 association with an IEEE 802.1X capable network when the authentication mode setting is not set to IEEE 802.1X authentication.

8. The method of claim 1, wherein the step of checking user preferences for networking connectivity comprises the step of checking a connection policy file.

9. A method for connecting a computing device of a computer user to at least one network of a type selected from a group comprising a wireless telephone network, a wired infrastructure computer network, a wireless infrastructure computer network, and a wireless ad hoc computer network, the method comprising:

checking user preferences for network connectivity, wherein checking user preferences comprises the step of checking for an authentication mode setting and for a default mode setting;

scanning for network presence of the at least one network;

connecting the computing device to the at least one network based on the user preferences, wherein connecting to the at least one network comprises the steps of associating with a wireless infrastructure computer network, and connecting as a valid user with credentials;

if connecting the computing device to the at least one network fails, selecting an ad hoc mode of operation when the default mode setting is set to auto mode; and operating the computing device in an off-line mode when network connectivity is not available.

10. The method of claim 9, wherein the step of selecting the ad hoc mode of operation comprises the steps of selecting an ad hoc network, and attempting an IEEE 802.11 association with the selected network.

11. The method of claim 10, wherein the step of selecting an ad hoc network comprises the step of selecting a default ad hoc network.

12. The method of claim 10, further comprising the step of monitoring for the appearance of the wireless infrastructure computer network when the default mode setting is set to auto, infrastructure preferred mode, and connecting to the wireless infrastructure computer network upon its appearance.

13. The method of claim 10, further comprising the step of monitoring for the appearance of the wireless ad hoc computer network when the default mode setting is set to auto, ad hoc preferred mode, and connecting to the wireless ad hoc computer network upon its appearance.

* * * * *